(12) United States Patent
Askestad

(10) Patent No.: US 10,787,232 B2
(45) Date of Patent: Sep. 29, 2020

(54) STRUCTURAL SUSPENSION OF RADIAL TURRET BEARINGS

(71) Applicant: APL TECHNOLOGY AS, Kolbjørnsvik (NO)

(72) Inventor: Sigmund Askestad, Tvedestrand (NO)

(73) Assignee: APL Technology AS, Kolbjørnsvik (NO)

( * ) Notice: Subject to any disclaimer, the term of this patent is extended or adjusted under 35 U.S.C. 154(b) by 0 days.

(21) Appl. No.: 16/471,866

(22) PCT Filed: Dec. 21, 2017

(86) PCT No.: PCT/NO2017/000036
§ 371 (c)(1),
(2) Date: Jun. 20, 2019

(87) PCT Pub. No.: WO2018/117852
PCT Pub. Date: Jun. 28, 2018

(65) Prior Publication Data
US 2020/0086953 A1 Mar. 19, 2020

(30) Foreign Application Priority Data

Dec. 23, 2016 (NO) .................................. 20162053

(51) Int. Cl.
*B63B 21/50* (2006.01)
*F16C 19/34* (2006.01)
(Continued)

(52) U.S. Cl.
CPC ............ *B63B 21/507* (2013.01); *F16C 19/34* (2013.01); *F16C 19/545* (2013.01); *F16C 23/045* (2013.01); *F16C 2300/14* (2013.01)

(58) Field of Classification Search
CPC ....... B63B 21/50; B63B 21/507; F16C 19/34; F16C 19/545; F16C 23/045; F16C 2300/14
See application file for complete search history.

(56) References Cited

U.S. PATENT DOCUMENTS

| 5,240,446 A | 8/1993 | Boatman et al. |
| 5,316,509 A | 5/1994 | Boatman et al. |

(Continued)

FOREIGN PATENT DOCUMENTS

WO   WO 98/31585 A1   7/1998

OTHER PUBLICATIONS

International Bureau, International Search Report and Written Opinion in International Application No. PCT/NO2017/000036, dated Apr. 16, 2018.

*Primary Examiner* — Stephen P Avila
(74) *Attorney, Agent, or Firm* — Leydig, Voit & Mayer, Ltd.

(57) ABSTRACT

A structural suspension of radial turret bearing wheels in a turret bearing comprises a rail support structure mounted on a turret bearing support structure, a circular rail mounted to the rail support structure, and a plurality of radial wheels running on the mainly vertical inner side of the rail. The suspension includes a vertical flexible shaft, for each radial wheel, supported by an upper and lower support with a part of the shaft protruding with the radial wheel mounted close to the outer end. The inner side of the rail is a frustum with the shortest radius at the top and an aperture of $2\tau$, and the outer mainly planar contacting surface of the wheel has an angle $\theta$ relative to the rotational axis of the wheel, and is overlaid with a convex curvature across the contacting surface.

14 Claims, 14 Drawing Sheets

(51) Int. Cl.
*F16C 19/54* (2006.01)
*F16C 23/04* (2006.01)

(56) References Cited

U.S. PATENT DOCUMENTS

| | | | |
|---|---|---|---|
| 5,356,321 A | 10/1994 | Boatman et al. | |
| 5,762,017 A | 6/1998 | Groves | |
| 5,839,387 A | 11/1998 | Myklebust | |
| 5,893,784 A | 4/1999 | Boatman | |
| 6,263,822 B1* | 7/2001 | Fontenot | B63B 21/507 |
| | | | 114/230.12 |
| 8,197,293 B2* | 6/2012 | Gooijer | B63B 21/50 |
| | | | 441/5 |
| 2013/0199432 A1 | 8/2013 | Askestad | |

* cited by examiner (SECTION D-D)

STRUCTURAL SUSPENSION OF RADIAL TURRET BEARINGS

CROSS-REFERENCE TO RELATED APPLICATIONS

This patent application is the U.S. National Stage of International Patent Application No. PCT/NO2017/000036, filed Dec. 21, 2017, which claims the benefit of Norwegian Patent Application No. 20162053, filed Dec. 23, 2016, which are each incorporated by reference.

TECHNICAL FIELD

This invention relates to offshore installations, in particular to a structural suspension of radial turret bearings for handling the large radial loads in a turret bearing system usually found at the surface termination of a riser on a turret mooring related to extraction of hydrocarbons. A method for changing the position of a shaft relative to the rail is also provided.

BACKGROUND

Turret mooring systems have been in use for some decades and as the search for hydrocarbons has increased, the depth from which hydrocarbons can be extracted has increased. The risers coming from greater depths are associated with greater loads and the turret bearings now have to handle hundreds of tons. If the turret bearings fail production must stop. Because of this it is desirable to maintain the turret bearing while operating or minimize the length of the stoppage and/or prolong the lifetime of the bearing system. To this end an exchangeable suspension of radial turret bearings with a long lifetime and featuring suitable spring effects has been devised.

For good load sharing of the radial turret bearings, some kind of spring system must be installed. Spring systems being used in existing radial turret bearing systems often include hydraulic cylinders and spring packages, and combinations of those two.

Hydraulic spring systems in radial bearing systems are comprehensive and complicated, especially the control system. The function requirements to keep the turret in center and a good load sharing are in conflict with each other. As an example a hydraulic system with all radial bearing units connected in series have good load sharing features, but without any restraining effect onto horizontal loads. Such systems therefore need either a complicated pipe distribution system or control system or a combination of those two systems.

A further challenge to spring systems is the combination of transverse loads and movements while subject to simultaneous axial displacements; A radial bearing unit will thus be subjected both to horizontal forces from horizontal turret displacements within the rail system and lateral loads caused by turret vertical displacements: A main contribution to lateral loads is vertical friction effects from the combined effect of horizontal bearing loads and vertical turret displacement.

Spring packages are based on super high strength materials which are susceptible to hydrogen embrittlement in a marine environment. Furthermore, the hydraulic and spring packages require space, much because of the need to handle the lateral loads. Since turret bearing systems are subject to extremely high horizontal loads compared with the circumference, the bearing units is required to be closely arranged.

In order to improve the durability of the turret bearing and increase the availability of space on the turret a suspension system according to claim 1 is provided. Wheels are the preferred bearing units as are shown in all the above described illustrations since wheels with sliding bearing in the hub offer a suitable combination with regard to moderate torque and facilitates the relative vertical movements between the turret and the vessel represented by vertical movements of the shaft relative to the rail. However, the wheels may be replaced by sliding bearing pads. Such pads should then be combined with a spherical bearing as well to handle the relative angular movements which arises between the vertical shafts and the rail.

SUMMARY OF INVENTION

The invention relates to a structural suspension of radial turret bearing wheels in a turret bearing, comprising a rail support structure mounted on a turret bearing support structure, a circular rail mounted to the rail support structure, and a plurality of radial wheels running on the mainly vertical inner side of the rail.

The invention is characterized by a mainly vertical flexible shaft, for each radial wheel being supported by an upper and lower support with a part of the shaft protruding like a cantilever with the radial wheel mounted close to the outer end.

Furthermore the inner side of the rail is a frustum with the shortest radius at the top and an aperture of $2\gamma$, and the outer mainly planar contacting surface of the wheel has an angle $\theta$ relative to the rotational axis of the wheel, and is overlaid with a convex curvature across the contacting surface. The axis of the wheel is tilting an angle A relative to the unloaded position of the axis, when the shaft is under maximum load, and an angle E between $\gamma$ and the tangent of the curvature across the contacting surface is less than zero at the top for conditions without load and larger than A at the bottom for conditions with maximum load. The flexibility and length of the shafts, the clearance between the wheels and rail, and the positions of the upper and lower shaft supports are chosen such that the sector distributing the radial load on the rail increases as the radial load increases.

In another aspect the invention relates to a method for changing the position of a shaft relative to the rail comprising the following steps: loosen the bolts holding the top lid of the housing, lift the shaft sufficiently to free the mating surfaces at the bottom end of the shaft, turn the shaft to obtain the desired position, lower the shaft for the mating surfaces to lock, and tighten the bolts holding the top lid of the housing.

BRIEF DESCRIPTION OF THE FIGURES

For better understanding of the invention the device will be described with reference to the figures. Like numerals describe like parts in the different figures.

DETAILED DESCRIPTION

Directions referred to in this text are related to a turret 5 with a vertical central axis in operation at sea 4. It is also conceivable that the turret could be mounted at an angle, but to make writing easier this is omitted in the text.

Figure 1:
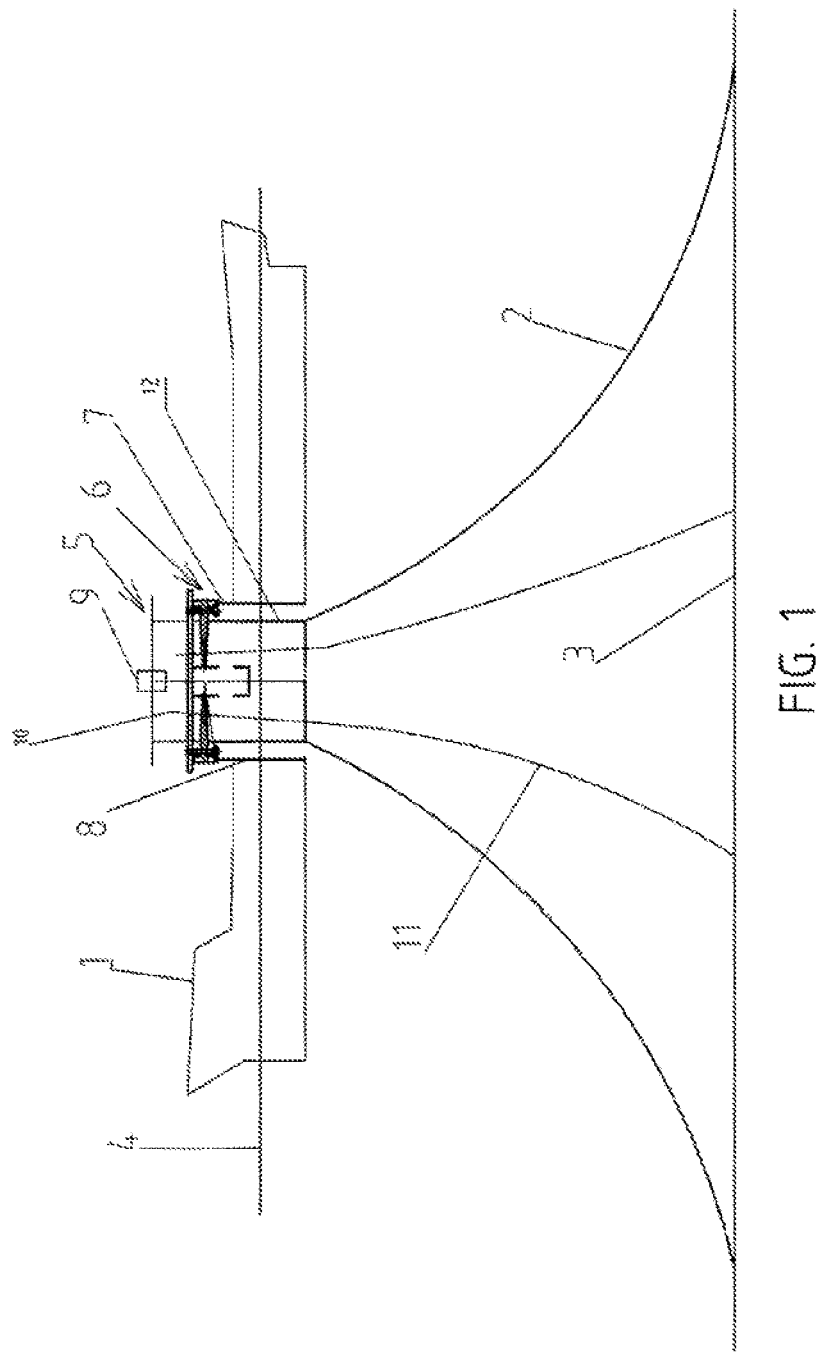
FIG. 1 shows a turret moored vessel.

FIG. 1 is showing a turret moored vessel 1. A turret barrel 12 is rotating inside a turret well 8 and is geostationary relative to the sea floor 3 and the mooring lines 2 keep the vessel in position and the risers 11 connects the flowlines (not shown) at the sea floor with the vessel through the riser termination piping 10 in the turret through the rotary pipe connection (swivel) 9. The turret bearing 6 features an endless low-torque rotation of the vessel relative to the turret.

Figure 2:
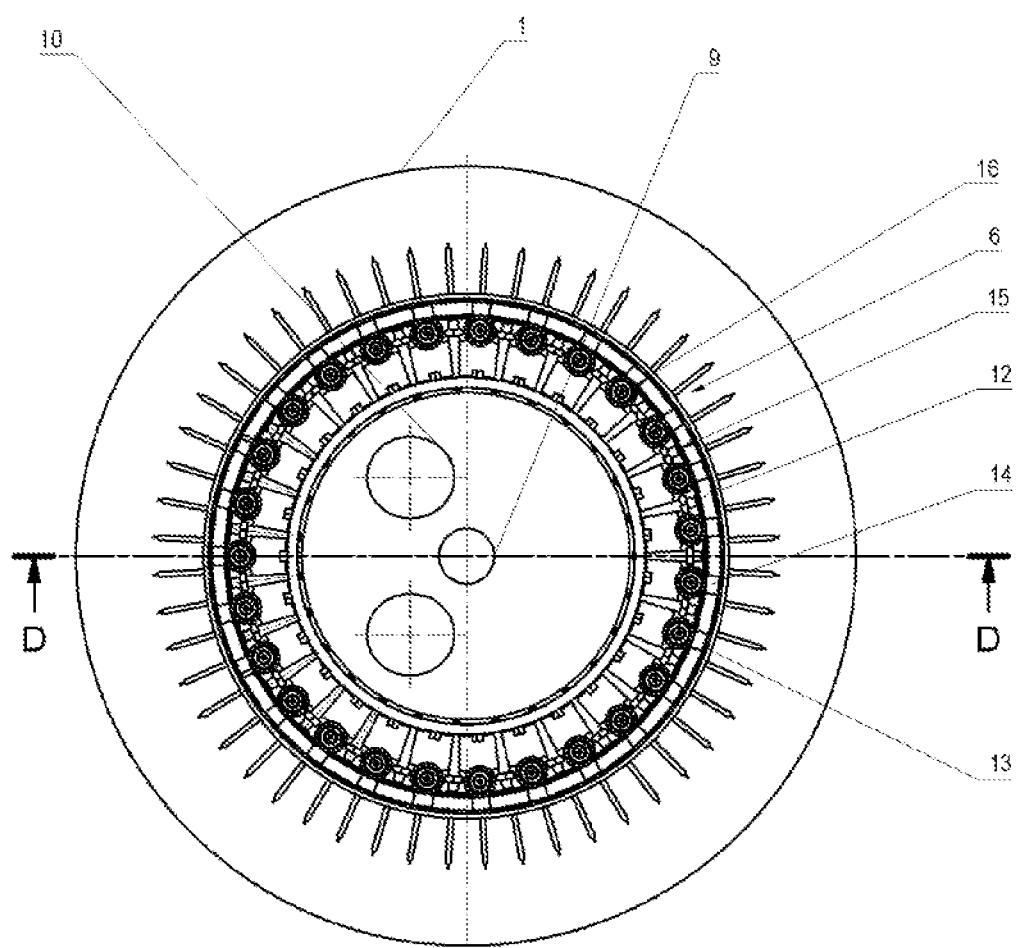
FIG. 2 shows a top view of a cross section of the turret wheel bearing with both horizontal and vertical wheels.

FIG. 2 is showing the plan or top view of the turret with turret bearing 6. Radial wheels 16 are horizontally mounted on the inside of the rail 14 and transfers the horizontal component of the turret loads, from mooring and the riser system in particular, to the vessel 1. The radial wheels are centralizing the turret within the rail system with the turret so that the piping system on the turret and the vessel through the rotary fluid connection, swivel 9 are kept sufficiently centralized to avoid detrimental offsets. Too big offsets will create large stresses in the pipe connections and loads in the swivel unit.

Figure 3:
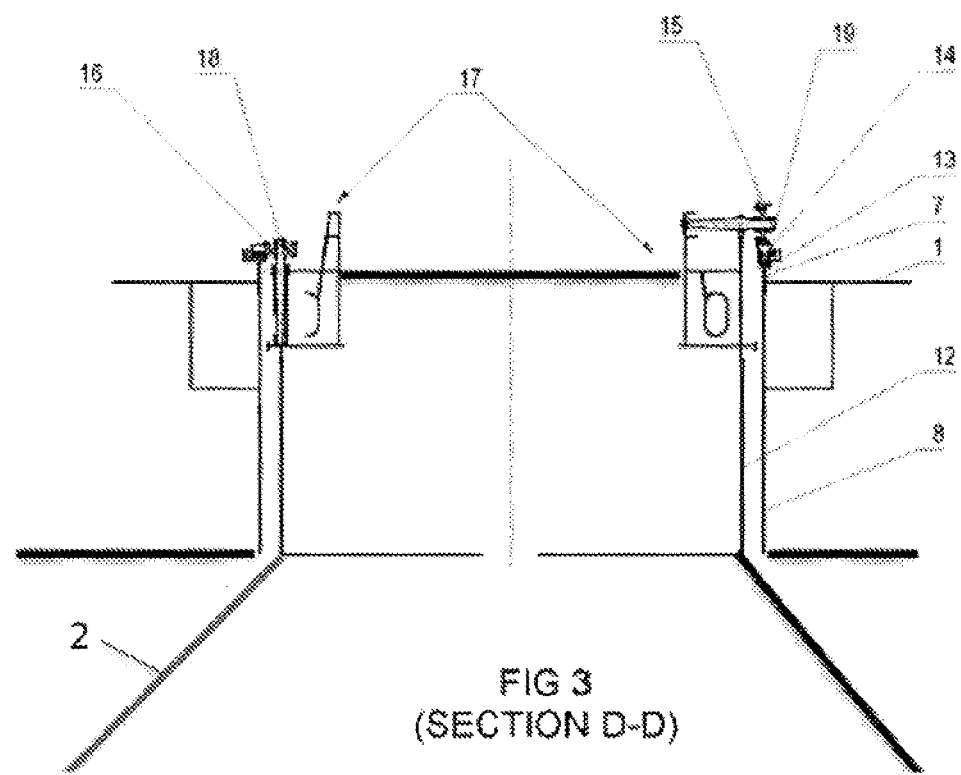
FIG. 3 shows a cross section of a turret bearing along the line D-D in FIG. 2.

FIG. 3 is showing a section of the turret defined by the line D-D in FIG. 2. The turret bearing includes here an equal number of axial wheels 15 and radial wheels 16. The wheels rotate about shafts 19 and 18 respectively. The arrangement does however permit more radial than axial wheels. The shafts are fixed to a bearing support structure 17 transferring the turret loads to the turret structure including the turret barrel 12.

Figure 8:
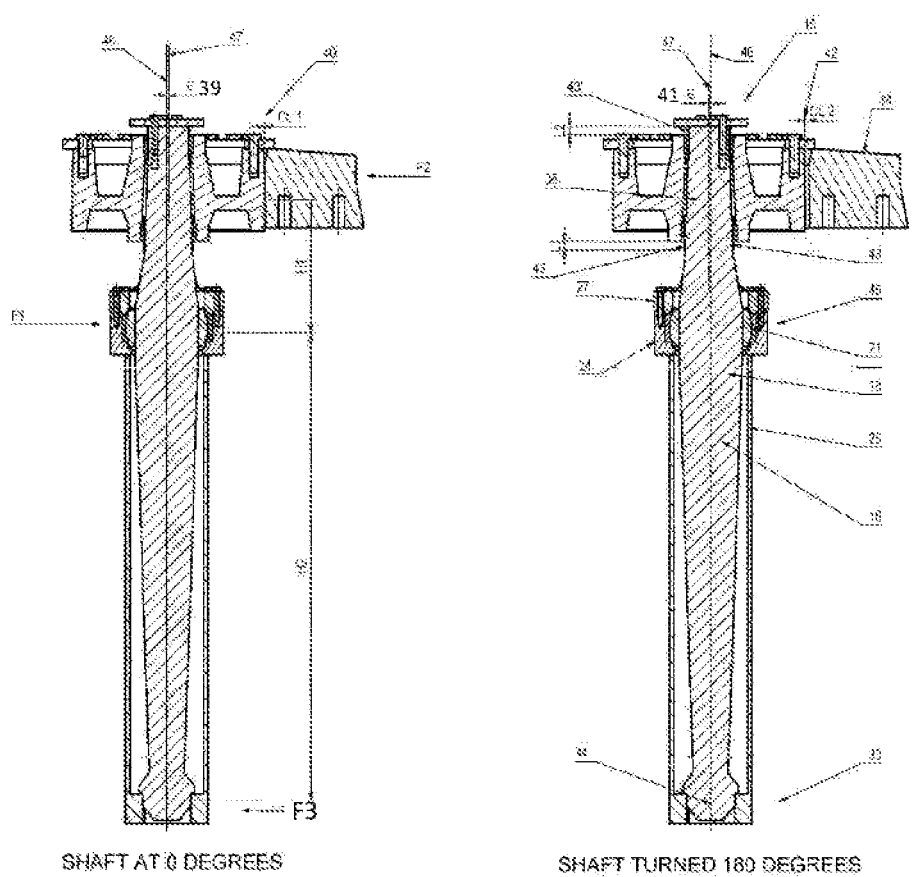
FIGS. 8 *a* and *b* shows two different angular positions of the shaft.

The mooring lines 2 are commonly fixed to the lower portion of the turret barrel 5 as illustrated in FIG. 1 and in FIG. 3 or extended all the way up to the upper portion of the turret. The axial wheels are rolling on the upward facing part of the rail 14 and the radial wheels on the inward facing part of the rail 14 (FIG. 8). Both the axial and the radial wheels are beneficially rolling on the same rail.

Figure 4:
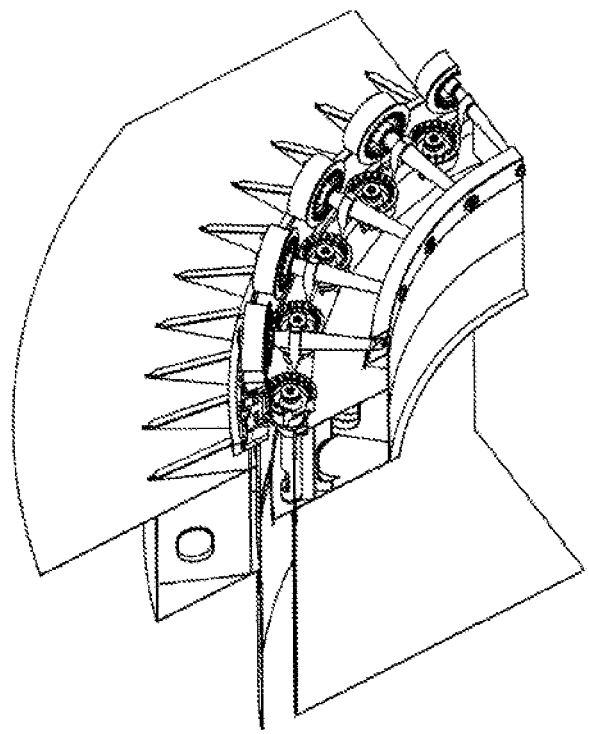
FIG. 4 shows a segment of the turret wheel bearing with a clear view of the wheels.

FIG. 4 is showing a segment of the bearing arrangement comprising axial wheels handling the axial turret loads and are rotating on horizontal shafts and radial wheels handling the radial turret loads rotating on vertical shafts. The shafts are all arranged in the bearing support structure on top of a turret structure. The wheels are rolling on a rail which is mounted on top of a rail support structure 13 arranged on the vessel/floating unit and mounted to a turret bearing support structure 7.

For limiting the lever arm or overturning effects from the risers and mooring lines in the turret bearing 5, the location of the radial bearing at a low elevation is particular advantageous. And then it is particular advantageous with the herein described structural spring system which is not as sensitive to marine environment as the hydraulic and mechanical spring systems are.

The radial turret bearing system described below is based on the bending flexibility of a structural element, here a steel shaft or structural element with structural spring system for optimal good load sharing between the radial wheels handling the horizontal loads in a turret bearing system. The structural springs are based on high strength alloy steel resistant to embrittlement from the ocean environment, and are shaped with a fair geometry with low stress concentration factors and excluding welding for good fatigue properties. The flexible structural spring elements are favorably supported by elements that are flexible to the bending deformations of the structural spring element. Such elements may either be spherical joints as described further below, a ring comprising elastomeric material, or it may be comprised of slender connections such as is described in P 32891

The structural spring system is characterized by using a long slender structural shape, with a cylindrical, rectangular cross section or any suitable cross section in a steel suitable as structural or machined elements such as low alloy CrMo steels. The portion between the bearing unit and the closest support is like a cantilevered arm creating the bending moment effects which causes the structural element to deform and advantageously flex.

A flexible spring system is required to spread the horizontal loads onto several bearing units both due to the clearances and the ovalization. The radial flexibility of the turret is quite necessary, firstly for load sharing due to radial clearance between the radial bearing units and the rail. The larger the clearance the more flexibility in the radial bearing units are required for utilizing the same angular sector of radial wheels. A radial turret system need some clearance between the nominal positon of the radial bearing units and the rail for several reasons, the most dominant being the ovalization of the turret well and the rail support structure caused by the global and local deformations of the vessel's hull under effects such as the ocean waves and vessel load distribution. Typical horizontal deformations are in the order of 5 to 20 mm depending on the size and location in the vessel.

The second significant reason for the necessity of radial flexibility of the turret is tolerances to both local and global roundness of rail and location of the bearing units along the pitch circle relative to the rail as well as tolerances to sizes of the various members in the bearing system.

The radial clearance between the radial bearing units and the rail should be large enough so that no significant pressure arises at any location along the periphery of the bearing system even at the worst hogging or sagging conditions of the vessel or from the effects from the tolerances.

In a preferred embodiment the steel shaft 18 is supported by a low friction spherical baring 21 at the upper shaft support 45 which easily adapts to the angular displacement of the shaft. The support closest to the bearing unit is handled by a spherical bearing. The spherical bearing 21 comprises a spherical ball 22 gliding on a spherical ring 23. The lower end of the shaft is in the preferred embodiment simply supported in the support for further contribution to low resistance to shaft displacements, but may also be supported in any type of bearing including spherical bearing. Furthermore, the stab-in type support makes the shaft easy to retrieve for service or replacement while operating offshore. A polygon shaped cross section at the end of the shaft and its mating support is furthermore an easy way of adjusting the clearance between the bearing units and the rail even while in operation offshore.

The radial wheel bearing units are advantageously equipped with a flange on top for accurate positioning of the radial wheel relative to the rail. The radial wheel will thus advantageously align vertically with the rail and not the turret which is moving up and down relative to the rail due to the structural deformations in the turret and the spring effects in the axial bearing system. The turret is constantly moving up and down according to the dynamics of the vessel subject to the ocean waves, more when the bearing loads are greater. Hence, it is a great advantage to ensure that the wheel remains in a permanent vertical position relative to the rail and avoid scuffing effects in the contact areas between the wheel and the rail. The vertical relative movements will be absorbed between the low friction slide bearing bushings in the wheel hub and the shaft rather than between the rail and the wheel. The highly stressed wheel-rail contact surfaces are designed for rolling, not sliding.

Highly-stressed contact surfaces 65, 66 between the radial wheels 16 and the rail 14 should not be subject to detrimental edge pressures. The radial wheel contact surface 50 is hence favorably slightly coned upward with an angle $\theta$ and overlaid a convex curvature to permit the wheel to tilt in the vertical plane along with the angular displacement of the shaft upper portion 38. The convexly curved contacting surface are also beneficial for handling tolerance-induced angular deviations over the turret circumference as well as the angular displacements caused by the spring effects in the axial bearing system and due to general structural displacements in both the vessel and the turret when exposed to changes in both load conditions and mooring, riser and other dynamic load effects.

The curvature of the wheel is preferably asymmetric, with the initial contact between the wheel and the rail in the upper portion of the radial wheel and rail, or in other words, in the far end away from the radial shaft supports. The region of the contact surfaces will then move from a position in the far end from the radial shaft supports to a closer one as the wheel tilts with increasing wheel load. The curvature of the outer contact surface of the wheel 50 is correspondingly decreasing closer to the supports of the shaft 18. The wheel has the most curved surfaces in the far end away from the shaft supports where the bearing unit loads are low and less curvature closer to the radial shaft supports where the loads are high. This is for maintaining the same pressure per contact area and at the same time utilizing the height of the rail 14.

The sliding bearings, bushings 30 and 30' are arranged on a long wheel hub compared with the radius of the wheel to counteract locking effects to ensure that the wheel slides along the shaft rather than the rail.

Figure 5:
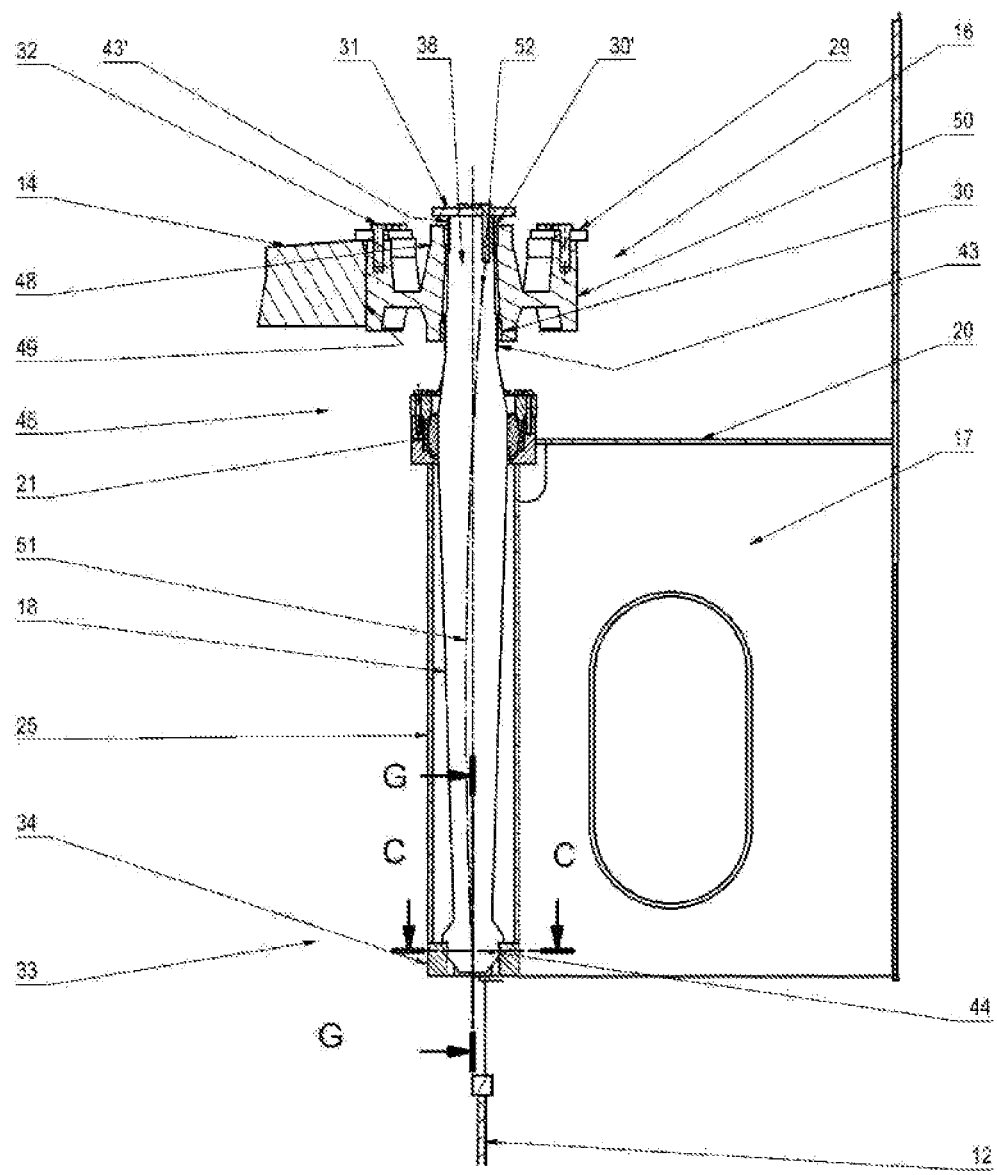
FIG. 5 shows a cross section of a shaft and wheel and the support structure.

FIG. 5 is showing a cross section of a radial wheel 16 mounted onto a shaft 18 in its support structure 17. The wheel with bearing bushing 30 and 30' in both ends of the wheel hub 48 is free to rotate about the shaft upper portion 38.

The upper portion 38 of the shaft 18 extends substantially above the upper shaft support 45, and has a tapered cross section upwards toward the wheel. The diameter of the shaft in the upper bearing bushing 30' is also beneficially smaller than the diameter of the bushing 30. The tapering of the shaft also within the height of the wheel contribute to the flexibility of the shaft. Furthermore, the lower loads on the upper portion of the wheel favors a smaller bearing bushing area since such self-lubricating bearings are attaining higher friction coefficients for very low loads The main portion of the shaft extending downwards from the upper shaft support 45 to the lower end 44 of the shaft within the lower shaft support 33 is also tapered gradually as illustrated in FIG. 5.

The shaft 18 is extending substantially above the upper shaft support 45, while the portion which is located inside the pipe 25 extends downwards to the lower shaft support 44.

The wheel is also free to slide vertically along the shaft. The wheel is favorably equipped with a flange 29, fastened by bolts 32, to keep the wheel in vertical defined position relative to the rail. The shaft is kept in position by an upper support 45 and a lower shaft support 33.

A disc 31 limits the possibility of the wheel to work its way too far upward both during operation and during installation and maintenance operations, and it serves as a protection for the bearing 30'. A skirt like cover 28 is beneficially arranged onto the disc and downwards beyond the top of the bearing; with a larger diameter than the hub part of the wheel. Such cover will effectively protect the wheel bearing from intruding dirt.

There is one bearing bushing 30 in the lower end of the wheel hub 48, and a second bushing 30' in the top end of the wheel hub. The upper bushing 30' has advantageously a smaller diameter than the lower bearing bushings 30. The bearing counter material 43 on the shaft is advantageously extended top and bottom of the wheel position with a length L1 in the bottom end of the wheel hub and L2 at the top end of the wheel hub. This permits the wheel to slide up and down along with the changing position of the turret relative to the vessel and the vertical movement imposed by the angular deflection of the wheel. This is an advantage for the wear of the rail to wheel contact surfaces since the vertical relative movements then will occur in the contact between the wheel bearing surfaces 30, 30' instead of the high loaded contact region between the wheel surface 50 and the rail surface 49. These surfaces are subjected to high contact pressure and horizontal movements should be avoided in order to prevent detrimental scuffing in the contact surfaces. The hub bearings are significantly more suitable to handle such movements.

The flange on the wheel secures the position of the wheel with regard to downward movements relative to the rail. The weight of the wheel keeps the wheel resting onto the rail during idle load conditions, and helps the wheel to remain in that position during loaded conditions as well.

The wheel has a curved cross sectional profile as is illustrated in FIG. 9. The surface 50 is thus double curved suitable for rolling along the rail as well as tilting laterally onto the mainly vertical inward raceway 49 of the rail 14. The curved profile of the radial wheel ensures that there is a proper contact area between the wheel and rail without hard contact pressure at the edge of the rail both at small loads and when the shaft deflects most at extreme loads.

The upper shaft support is fixed to the top of a pipe 25 and the lower shaft support 33 is fixed to the bottom end of the pipe 25. The pipe is shown welded to the ring 34 in the bottom and to the housing 24 for the spherical bearing in the top, and it is also welded to the general bearing support structure 17. The pipe 25 is suitable for connecting the shaft supports with the supporting structure, and for providing a dry and protected space for the shaft. However, a box section may replace the circular pipe. Alternatively, the housing 24 for the upper bearing and the ring 34 for the support of the lower end of the shaft may be welded to any structural shape.

The parameters: a) the curvature of the wheel profile, b) the width of the wheel contact surface 50 and the rail inward face 49, and c) the inward face of the rail coned with an angle τ and the relative angle Θ describing the angle of the wheel contact surface 50 without the overlaid curvature in relation to the vertical line, are adjusted to fit the angular displacement of the wheel and shaft relating to the shaft elastic deformation 52 (FIG. 5 and in FIG. 9). Then a system with a controlled wheel position, with a predictable and repeatable load deflection curve has been obtained. The shaft and wheel suspension system has but a small foot print area on the turret 5. The shaft with supports requires less space than ordinary hydraulic or mechanical spring systems, and the suspension structures and devices may be kept inward/away from the turret wheels. It permits the wheel to track the rail with limited restrictions. The spring system is simple and without any mechanical devices.

Figure 6:
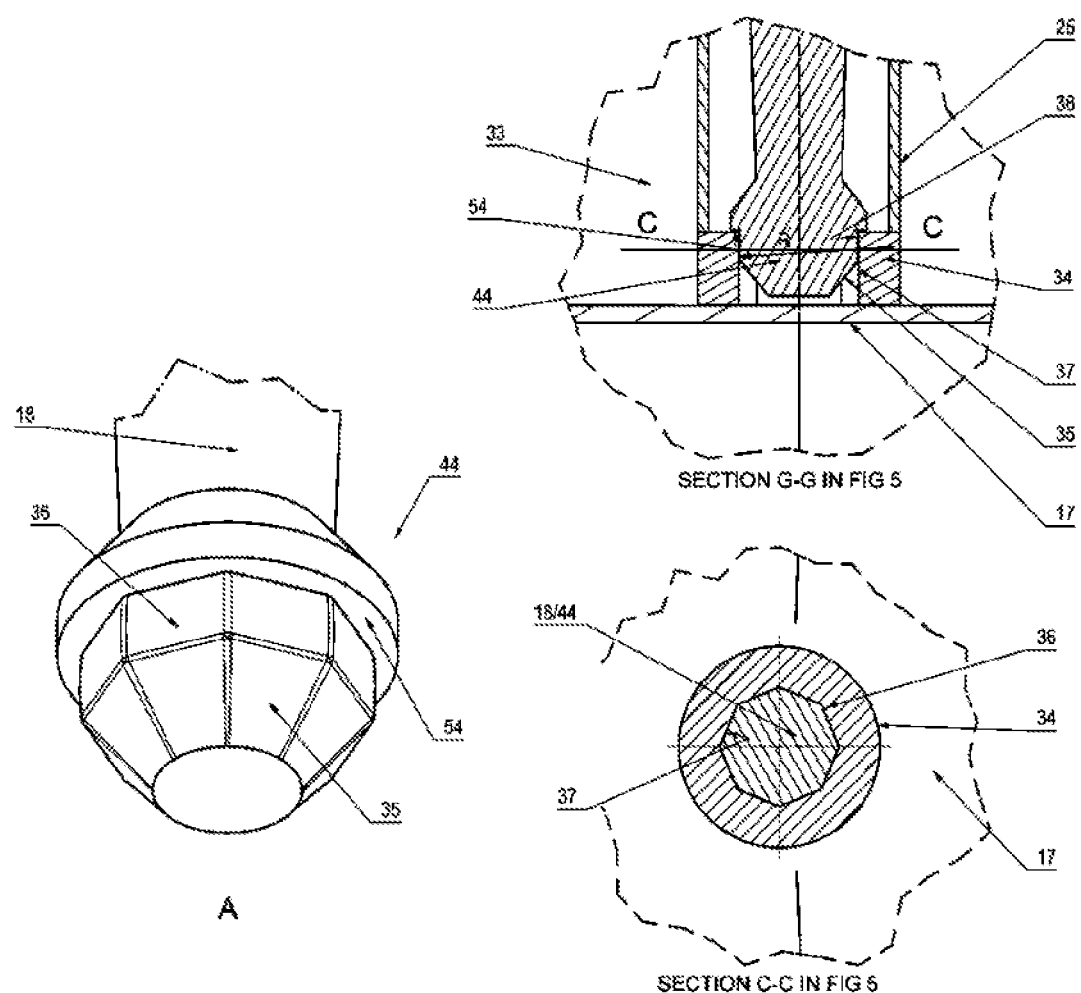
FIG. 6 shows the lower part of the shaft in more detail.

FIG. 6 shows a close-up section of the lower shaft portion 44 protruding down into the lower shaft support 33, with reference to the section lines G-G and C-C in FIG. 5.

The lower shaft portion 44 comprises three sub portions or sections; A lower conical termination 35, slot type geometry with a sloping profile suitable for stab-in operation of the shaft down into position. A substantially cylindrical portion with surfaces 36 with clearance fit tolerances with the inward face 37 of the ring 34. This portion is beneficially made with a polygon cross section as illustrated in cross section C-C. It could also be shaped as a cogwheel with more than two teeth. The profile of each of the surfaces 36 is further preferably made with a curved profile as illustrated by radius R' in section G-G (FIG. 6). The reason for this curved surface is to permit the shaft to easily attain an angular displacement at the lower support 33.

The third, upper sub-portion of the lower portion 44 of the shaft is made as a ring with a diameter a little larger than the width across the corners of the surface 36 forming downward facing surface 54. This face is close to the upward face of the ring 34; however normally not in contact except for a back-up in case the spherical ball 22 unexpectedly slides along the shaft 18. This leaves by purpose a small gap between the downward facing surface 54 and the ring 34 to permit the shaft to bend without obstructions.

The cross section of the lower portion of the shaft in way of C-C may have polygon shaped cross sections, preferably a hexagonal or octagonal geometry. The supporting ring 34 has a complementary shape. Such cross sections of the lower support are advantageous in combination with an eccentricity in the shaft upper portion 38 relative to the main portion of the shaft 18 as supported by the upper and the lower shaft support. One way of obtaining such eccentricity is illustrated in FIG. 8. Thus, the clearance between the radial wheel and the rail may easily be adjusted.

The method for changing the position of a shaft relative to the rail will comprise the following steps: a) loosen the bolts 26 holding a top lid 27 of the housing 24. b) Lift the shaft sufficiently to free the mating surfaces at the bottom end of the shaft. c) Turn the shaft to obtain the desired position and corresponding clearance to the rail. d) Lower the shaft for the mating surfaces to lock. e) Tighten the bolts 26 holding the top lid 27 of the housing.

Figure 7:
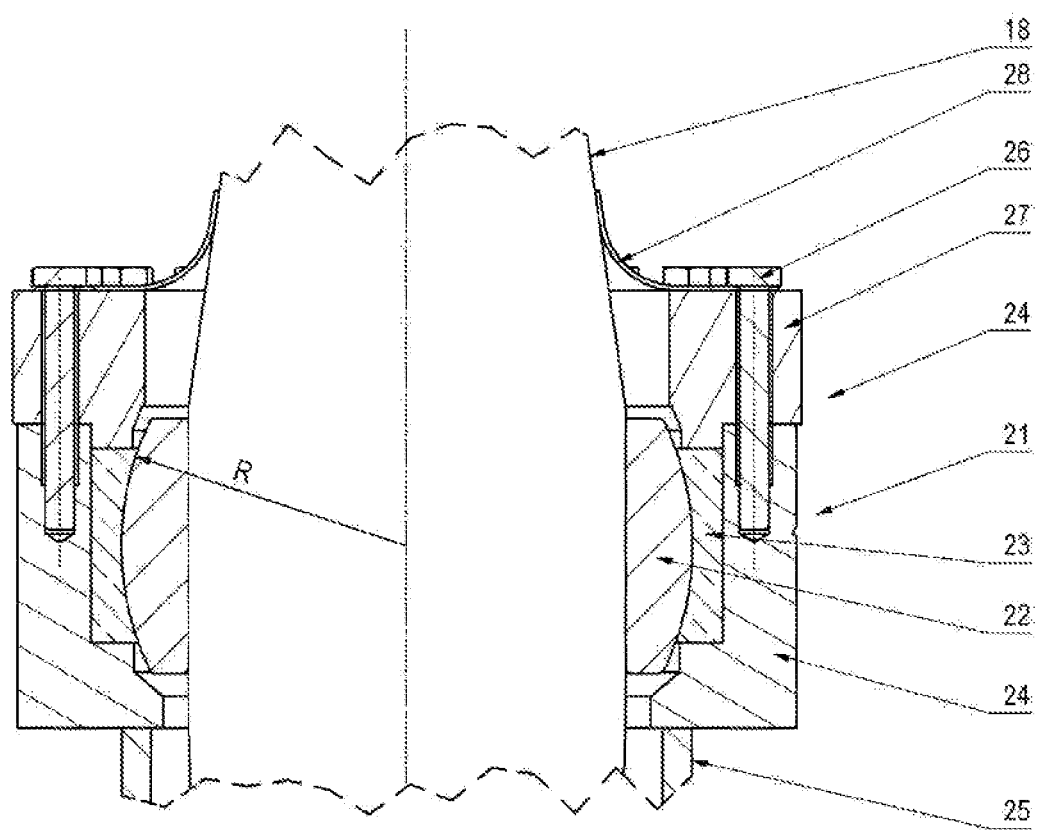
FIG. 7 shows a cross section of a shaft with a spherical bearing.

FIG. 7 is a close-up of the upper shaft support 45. The upper shaft support comprises a spherical bearing assembly 21 which is kept in position within a housing 24. The spherical bearing assembly 21 includes a spherical ball 22 with a complementary shaped ring 23 with a gliding surface. The ball is made of a suitable counter material to the sliding material in the ball 21, and has a radius R with its center coincident with the Centre Line (CL) of the shaft 18. The ring 23 is kept in position by the housing 24 and a disc 27; all kept assembled by bolts 26. The ring 23 is made with a clearance fit with the inner radius of the housing 24.

The spherical ball 22 is fixed to the shaft 18 by a shrink fit clearance or/and by protruding rings on the shaft, or bolts through the shaft or any other suitable means of locking a ring axially to a shaft.

FIGS. 8 a and b is showing the shaft assembly in FIG. 5 in two alternative configurations, with the shaft turned into two positions. The upper shaft portion 38 of the shaft has a centerline 47 offset 39 relative to the rotational axis of the shaft 18. The rotational axis of the shaft 18 coincides with the Centre Line (CL) of the shaft between upper shaft support 45 and lower end 44 of shaft. In FIG. 8a on the left-hand side the shaft is in a position with an offset E at the closest position to the rail so that the clearance between the rail and the wheel is CL1 (40). The shaft is retrieved a little by pulling the shaft with or without the wheel assembly a short distance up by unbolting the bolts 26. And turning the shaft corresponding with the separation angle between the polygon corners in section CC in FIG. 6. The shaft is turned 180 degrees in the sketch on the right-hand side of FIG. 6 yielding a larger clearance CL2 (42). The option to alter the clearance is advantageous with regard to installation of the turret in the vessel, where the turret including the bearing is lowered into the vessel. The radial wheels may then be in a retracted position to increase the clearances during the lowering operations. Furthermore, it is an advantage also during service. The radial clearance may be adjusted during service to counteract the effects of any wear in the bearing system. It is preferable to maintain a small clearance between the radial wheels and the radial rail to reduce the horizontal translation of the turret in the bearings—considering the benefit for the turret transfer systems, in particular the rotary pipe connector, swivel 9.

The principles for the loads on the shaft of the radial wheel are illustrated on the left-hand side of FIG. 8. A horizontal displacement of the turret in the vessel sets up a horizontal reaction load F2 between the wheel and the rail. The distinct elevation difference between the radial wheel and the upper shaft support 45 creates a bending moment F2 times the arm H1. The spherical bearing permits the shaft to flex into a curved shape as illustrated by the double dotted line 51 in FIG. 5. Therefore, the bending moment from the radial load F2 is counteracted substantially by the reaction load F3. The advantageous curved surfaces 36 also contribute to low resistance for the shaft to attain a curvature 51 with maximum horizontal displacement 52 of the radial wheel.

The radial spring effect is beneficially attained by the slender shaft, with a cross section tapered both upwards and downwards from the upper shaft support 45 with a sectional modulus adjusted with regard to the bending moments along the shaft for maximum deflection 52. The stresses are thereby kept at a relatively high level for maximum deflection with respect to the length of the shaft. The length of the shaft is determined by the flexibility required and the stress level, cross sectional modulus and E-modulus for the shaft material.

The preferable cross section of a shaft is circular since both the wheel and the spherical bearing are both based on a circular cross section. The shaft is advantageously made in a straight piece with a smooth surface without welding and be in an alloyed material having high strength and good fatigue properties.

FIG. 9 is showing details about the wheel and the rail. The first point of contact between the wheel and the rail at low wheel loads occur in the region 59. As the load increases, and the shaft bends, the contact point translates downward toward region 60 at extreme loads. The curvature of the wheel profile is illustrated by 3 radii, R1, R2 and R3. The advantage with a curved wheel surface is to ensure that the contact point between the wheel and the rail does not approach the edges of the wheel and rail raceway. The wheel should at least have a cross section with a single curvature. However, it is beneficial to use a progressive curvature, the smallest R1 in top where the loads are the smallest, and R3 the largest radius where the loads are the largest. In this way the material is best utilized, and the height of the rail may be lower than for a wheel with a constant radius curvature.

The inward face of the rail has an inclination angle $\tau$. the angle $\tau$ is typically 90-93 degrees, preferably about 90.5-91.5 degrees, in the range of 0.5 to 1.5 degrees from the vertical, so that the rail radius in top is advantageously a bit smaller than the rail radius in bottom of the rail. The wheel is correspondingly made with a bit larger diameter in the lower portion of the wheel than in the upper portion. This feature yields a small downward load component counteracting the deflecting shaft, and ensures that the wheel keep tracking downward without climbing as the wheel loads increases.

The angle $\theta$ shown in FIG. 9 is in the range of 0.2-1 degrees so that the outer surface of the wheel is moderately coned upwards. The inward face of the rail is coned with a profile as is shown in FIG. 9 with an angle $\tau$, thus forming a frustum with an aperture of $2\tau$. This angle is advantageously a bit larger than the angular deflection of the wheel when loaded, an angle corresponding with the deformed shape 52 in FIG. 5 at the shaft upper portion 38. The angular tilt of the wheel corresponds substantially with the angular deflection of the upper portion of the shaft. The coned wheel on the coned rail ensures that the wheel is tracking downward and the wheel maintains its vertical position relative to the rail.

The cone angles are subject to try and error analyses where the angles $\theta$ and $\tau$ are adjusted to ensure a steady wheel tracking, with a moderate downward pressure between the wheel flange and the rail.

The moderately coned wheel profile is overlaid with a curved surface. This profile has preferably a progressive curvature. The profile in FIG. 9 is based on 3 portions with curvature radii R1, R2 and R3. R1 is the smaller one with the smallest downward extension, R2 is larger, and R3 is the bigger one with the largest extension. The curvature radiuses are in the range of 1-3 m for the smallest one, and 7 m and up to such as 15 m for the largest one. This change in radius is for optimizing the utilization of the rail height, width of the contact surfaces between the wheel and the rail. The curvature may also be made with constant radius or with any other profile such as elliptic.

The initial contact at moderate loads occurs in the upper contacting surfaces 59 between the wheel and the rail. As the turret displaces further toward the rail, the reaction load between the wheel and the rail increases. The shaft deflects and the wheel tilts more and more. The contacting region between the radial wheel and the rail will then translate downward as the wheel rolls in the paper plane. The wheel curvature with the largest radius, R3 is engaged at extreme loads. The contact pressure is thus kept in the same range both at moderate, average and extreme loads. This is important for maintaining a moderate height of the radial rail and wheels representing immense weights of costly material.

For the preferred embodiment as described above with the coned wheels and rail, it is seen that it is advantageous with a eccentric shaft with the option to adjust the radial clearance between the rail 14 and radial wheels 16. The shaft with the wheel may be inserted with a good clearance, and then as the wheel has been lowered to the same level as the rail, the shaft may be turned from a large to a smaller clearance.

Figure 9A:
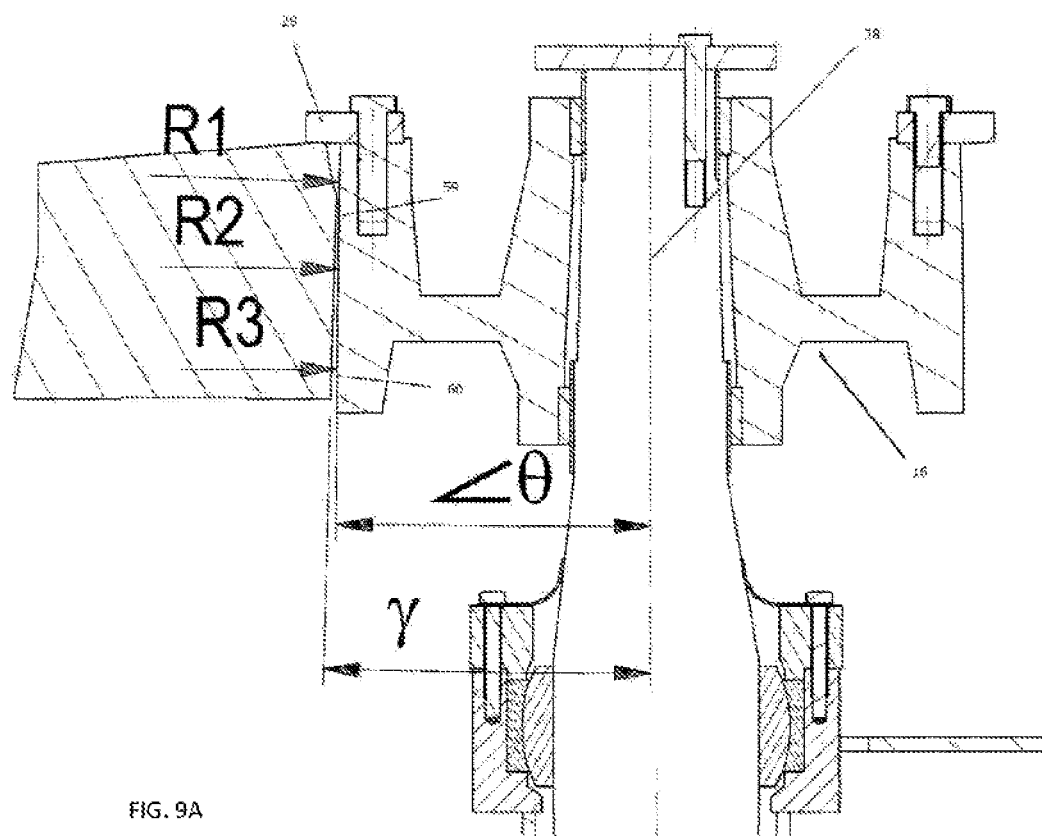
FIG. 9 shows the contact between the wheel and the rail.
Figure 9B:
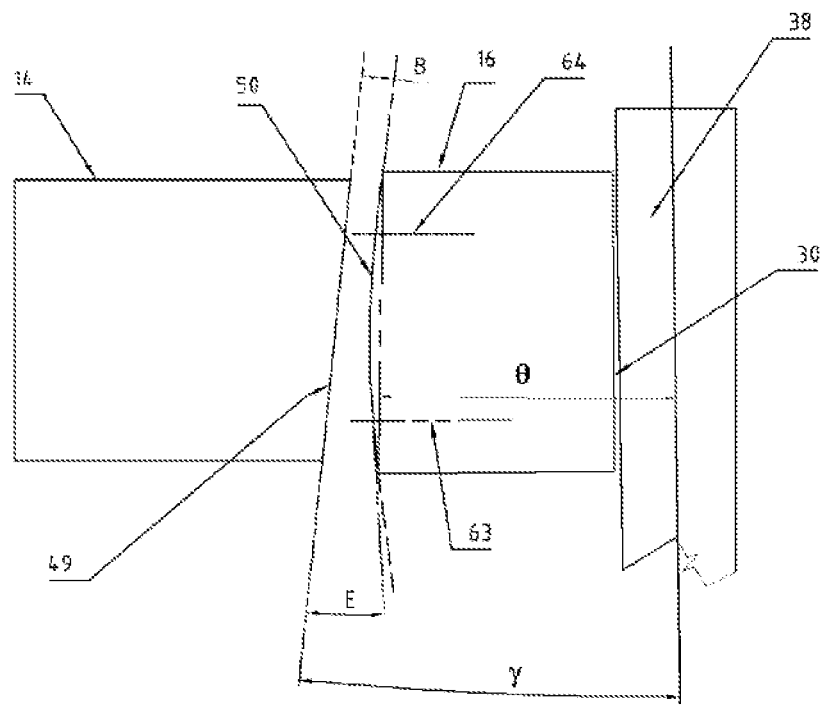

FIG. 9B is showing a wheel and rail with an exaggerated cross section of the wheel in neutral unloaded wheel condition. The rail has an inward cylindrical or slightly coned face with an angle $\tau$ from the vertical line:

The wheel as is shown with a single curvature cross section profile is designed for initial contact center in way of 64 and extreme load with its center at 63. The tangent line of the outer surface of the wheel 50 forms an angle E with the inner side 49 of the rail, which is positive when the angle between the tangent and the vertical line is smaller than $\tau$. The angle E at at line 64 is 0 or a little less to account for construction tolerances and so forth. The angle E in the lower portion of the wheel at line 63 is at least equal to the maximum angular deflection A of the shaft upper portion 38 at the wheel hub. It should be a little larger than A to account for angular tolerances as well as general deflections of the turret, turret and rail support structure, and the deflection effects of the axial bearing system.

Figure 9C:
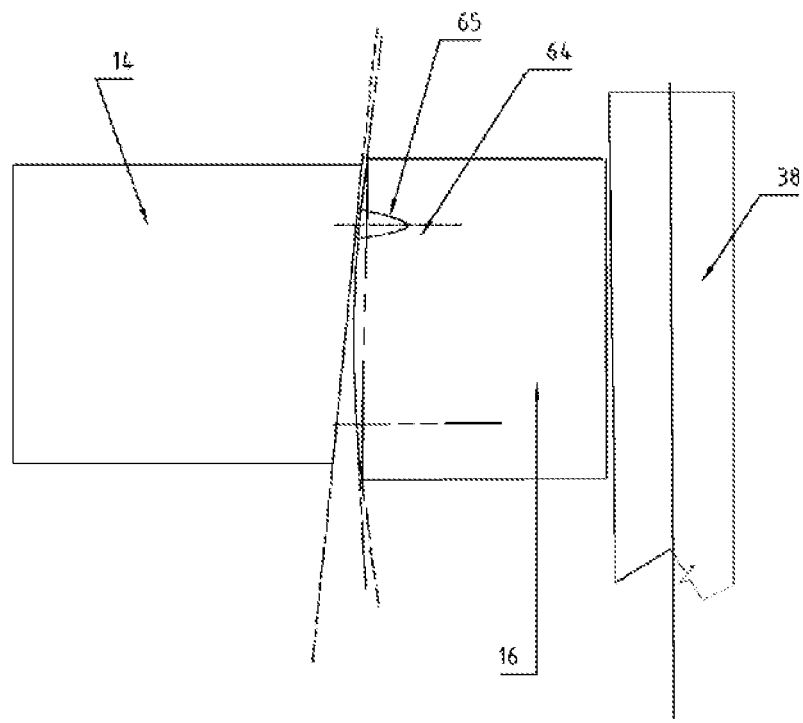

FIG. 9C is illustrating the wheel at initial contact between the wheel and the rail. The pressure and resulting contact area between the two surfaces at low loads is illustrated by the curve 65.

Figure 9D:
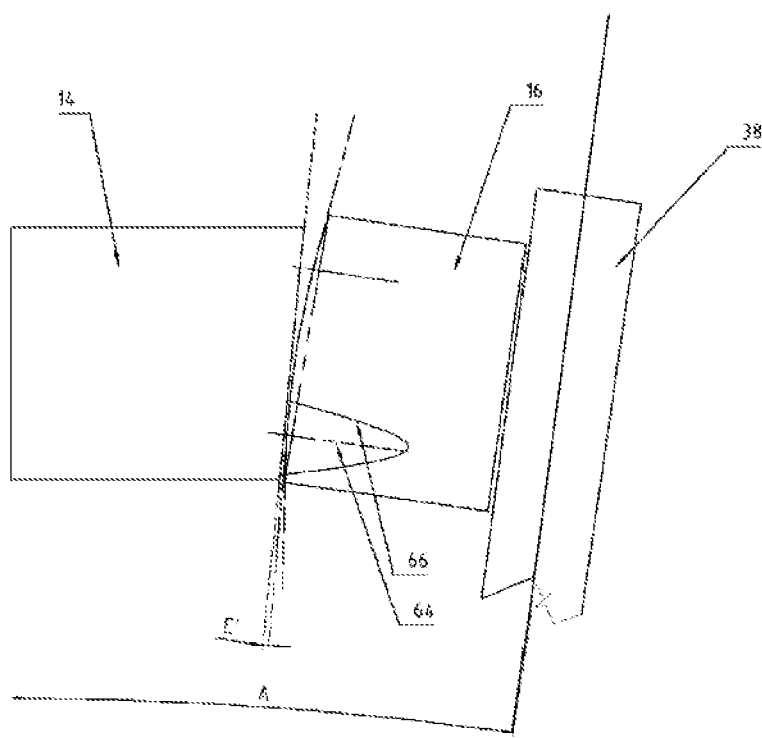

FIG. 9D is illustrating the condition of the wheel contacting the rail at extreme wheel loads. The wheel is tilting to the extreme shaft angular deflection A and the contact area between the wheel and the rail is at the lower portion of the wheel, however without contact pressure at the edge of the surface, as illustrated by the curve 66.

Figure 10:
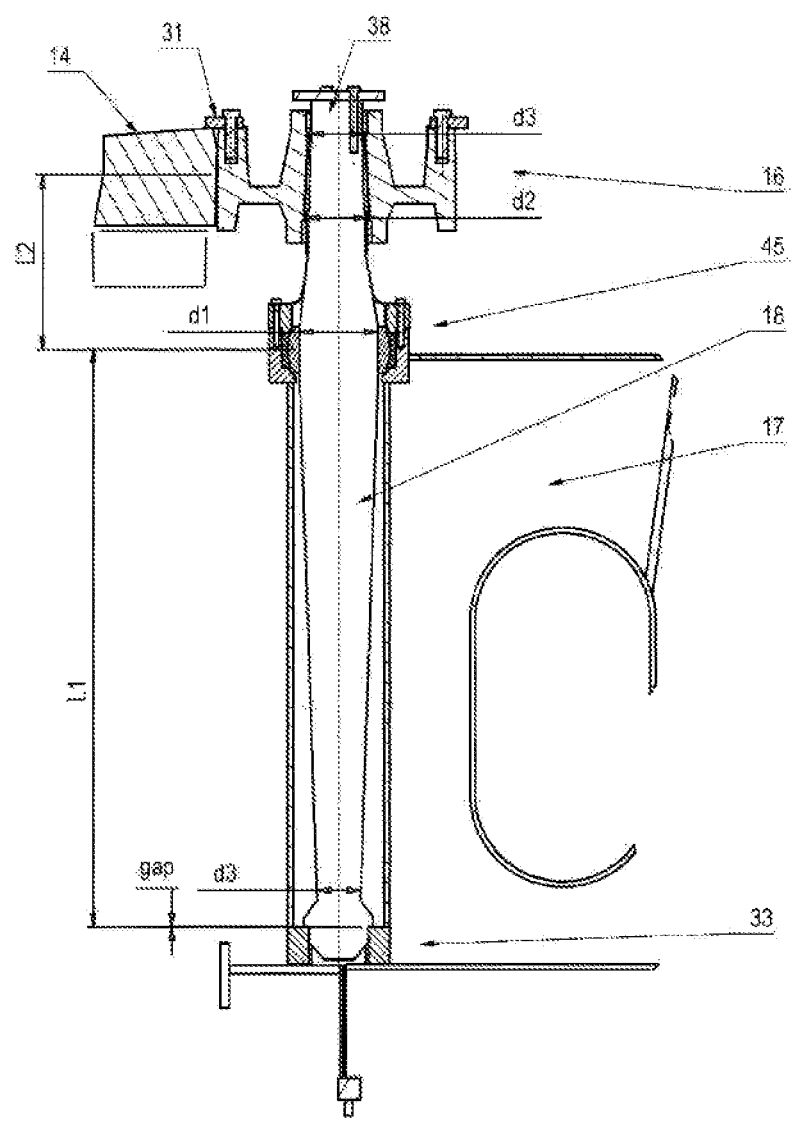
FIG. 10 shows typical dimensions of the suspension system.

FIG. 10 is showing the general dimensions for the wheel with the shaft spring system. A radial wheel will vary quite a lot pending on the size of turret and the environment in which it operates. The wheel load may vary from a few tons in calm weather to 50 and 100 tons in extreme conditions. In calm weather conditions the radial wheels only serve as centralizing means for the turret within the turret well 8 and the rail system 14.

A narrow clearance between the rail and the radial wheels ensures small radial movements of the turret during still water conditions without horizontal loads. When loaded, a narrow clearance ensures a better load sharing than a large clearance does. The optimal clearance is a little larger than the radial tolerances for the wheel and rail, the rail circumference plus the radial deformations of the turret and rail system, when the turret well and rail is deformed from external loads such as when the vessel is subject to varying longitudinal load distributions including the wave actions on the vessel.

The method described in FIG. 8 is illustrating a means for adjusting the radial position of the radial wheels and permits the wheel to be shifted to a position with a closer or larger gap relative to the rail. A closer gap may be desired due to wear or a larger gap might be required during lifting or retrieval operations.

The length and geometry of the shaft is depending on the desired spring effects. A smooth load distribution is required to utilize the load bearing capacity of all the bearing elements since the horizontal turret loads are immense compared with the available diameter of the turret bearing system. A rigid spring system with a defined radial clearance would cause just a few radial bearing units to take all the horizontal turret loads. Imperfections in the roundness of the rail and the location of the radial bearing units will further increase the loads on those few radial bearing units already heavily loaded.

On the other hand, a too soft spring system in the radial bearing system would cause the turret to displace too much for the turret to vessel transfer systems to handle. And would require a comprehensive spring system.

A reasonable radial wheel deflection is considered to be in the range of 5 to 15 mm depending on clearance between the radial bearing system and the rail and the tolerances defined for the bearing system.

Such deflections may be obtained by a shaft as shown in FIG. 10 where the overall length of the shaft is in the range of 1-3 m for a shaft diameter d1 in the range of 150 to 350 mm. The length L2 from the upper shaft support 45 to the wheel 16 is equal to about ¼ of the length L1 form the upper shaft support 45 to the lower shaft support 33.

The shaft in the shown illustration has a length L1, about 3 times the length L2. The advantage is that the preferred spring effect is obtained by a moderate shaft diameter. The reason being that a major portion of the spring effects is handled by the lower portion of the shaft, the length L1 and the cantilevered length L2 is shorter resulting in a smaller bending moment in the shaft and lesser cross section, diameter d1 of the shaft. Furthermore, the long portion L1 yields moderate reaction loads in the lower support 33 matching the simpler bearing design there. A further advantage is that the length L1 fits well with a practical shape of the support structure 17 with regard to construction and access. The support structure 17 is a toroidal ring preferably with a rectangular cross section and a bearing deck 20 on top. Both the lower support 33 and the upper support 45 are suitably aligned with strong horizontal structural elements.

The cross section of the shaft 18 is tapered downward from the largest diameter d1 at the upper shaft support 45 downwards to a diameter d3 at the lower shaft support 33. The diameter d3 is in the range of 40 to 60% of d1. The cross section of the shaft is also tapered upward from the upper shaft support (45) to a diameter d2 at the lower side of the wheel. D2 is in the range of 50 to 80% of d1. The flexibility and length of the shafts, the clearance between the wheels and rail, and the positions of the upper and lower shaft supports (45, 33) are chosen such that the sector distributing the radial load on the rail (14) increases as the radial load increases.

Figure 11:
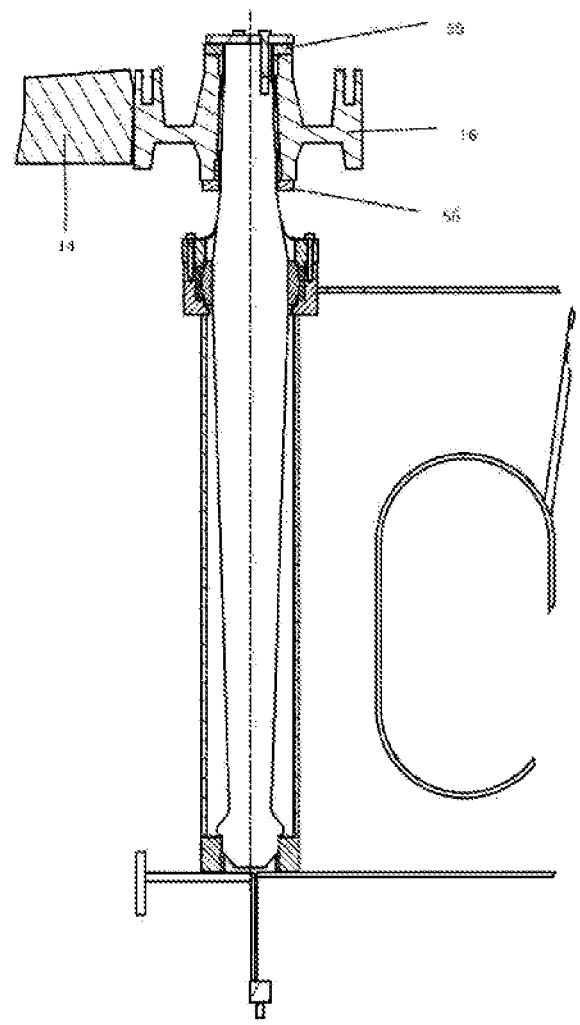
FIG. 11 shows restrainers for axial movement.

FIG. 11 is showing an alternative embodiment where the radial wheel is axially locked. The wheel body is hence without flanges. The axial wheel is free to rotate about the shaft but is restricted from sliding axially by the restrainers 55 and 56 above and underneath the wheel hub. The advantage being that no radial flange or coned wheel profile is required. However, any vertical displacement of the turret relative to the vessel will cause sliding between the rail and the wheel contact surfaces. Those movements may arise even without the turret turning. Hence the embodiment with a wheel which is free to slide axially along the shaft is preferred.

Figure 12:
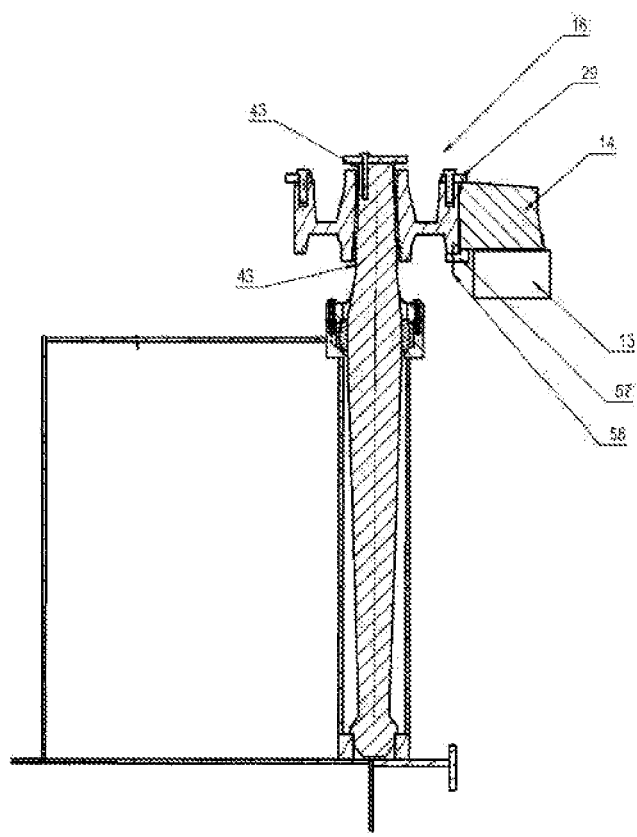
FIG. 12 shows an embodiment with flanges on the underside of the wheel.

FIG. 12 is showing an alternative configuration where the radial wheel is free to move along the shaft, but kept in vertical position by two flanges, one flange 29 in top and one additional flange 57 on the underside of the wheel 16. The flange on the underside is bolted to the wheel by the bolts 58. This flange 58 has then to be mounted onto the wheel after the turret with the wheel is lifted into the turret well and sitting on the axial bearing.

Another disadvantage with this solution is that the rail support structure 13 needs to be offset outward to give room for the flange 57.

Figure 13:
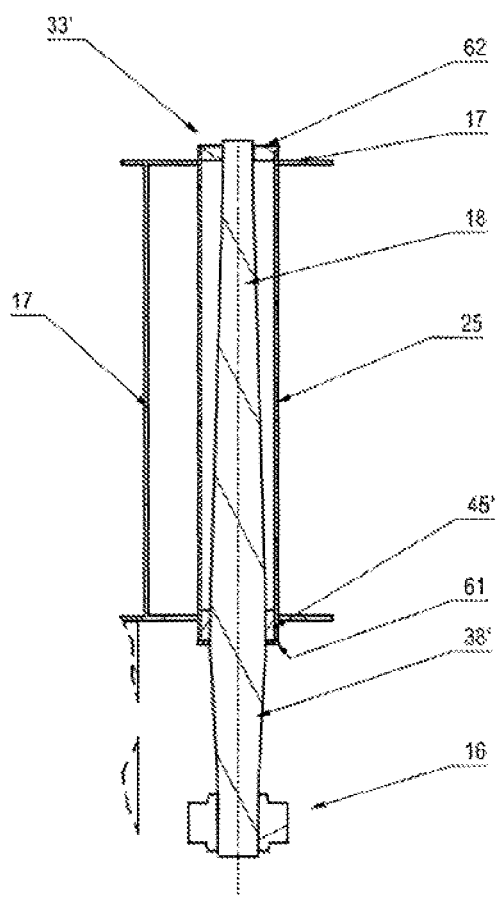
FIG. 13 shows an alternative configuration with the bearing support structure located above the rail

FIG. 13 is showing an alternative embodiment where the support structure 17 is arranged above the rail 14. The same principles apply for this as for the radial wheel support illustrated in FIG. 5-12 regarding spring effects. The principles shown in FIG. 9 will then be in the opposite order, or mirrored about a horizontal line. The mounting of the two shaft supports is indicated by 45' as the shaft support closest to the radial bearing unit, and 33' as the one in the far end of the shaft. Preferably a locking ring 61 for the radial shaft support closest to the radial wheel is mounted to stop downward movement of shaft. The upper shaft support 33' includes a disc 62 filling the gap between the upper shaft end and the pipe 25. This permits the shaft with the lower shaft (spherical) bearing assembly to be lowered downward through the pipe 25.

Definitions 1 vessel
2 mooring line
3 sea floor
4 water line
5 turret
6 turret bearing
7 turret bearing support structure
8 turret well in vessel
9 rotary pipe connector, swivel for fluid/gas/power connection
10 riser termination in turret
11 submarine riser
12 turret barrel
13 rail support structure
14 rail
15 axial wheel (turret bearing)
16 radial wheel (turret bearing)
17 bearing support structure
18 shaft for radial bearing
19 shaft for axial bearing
20 bearing deck
21 spherical bearing assembly for shaft 18, the shaft for radial wheel
22 spherical ball, mating material for sliding surface on ring 23
23 spherical ring with sliding surface
24 housing for spherical bearing
25 pipe, integrated part of the bearing support structure 17
26 bolts
27 disc, top lid of housing for the spherical bearing
28 protection cover of spherical bearing
29 Flange, radial wheel flange
30 bushing, bearing for radial wheel rotating about shaft 18. 30' indicates the upper bearing bushing
31 Disc with cover of wheel bearing
32 Bolt for wheel flange
33 lower shaft support
34 ring in lower end of pipe 25
35 conical termination of shaft 18
36 radial face in lower end of the shaft 18
37 inward face of ring 34
38 shaft upper portion, above upper shaft support 45
39 offset of wheel bearing center vs shaft cl through supports 39 and 47 represented by E in sketch shaft at 0 degrees 40 CL1 clearance between the radial wheel and rail inward face when shaft is in position 0 degrees, shaft offset E (48)
41 offset of wheel bearing center vs shaft cl through supports 39 and 47 represented by E in sketch shaft turned 180 degrees
42 cl2 clearance between the radial wheel and inward rail face when shaft is in position 180 degrees, shaft offset −E (50)
43 wheel bearing counter material
44 lower shaft portion protruding into the lower shaft support 33
45 upper shaft 18 support
46 shaft Centre Line (CL) between upper shaft support 45 and shaft lower end 44
47 CL of upper shaft portion 38
48 Wheel hub
49 Rail inward raceway
50 Outward contacting surface of wheel.
51 Deformed shaped of the shaft 18 when subjected to bearing load F2
52 Horizontal displacement of radial bearing unit subjected to a wheel load F2, reaction load of a horizontal displacement of the rail 14 toward the wheel
54 Downward facing surface on lower end of shaft
55 Restrainer for axial movement of wheel upwards
56 Restrainer for axial movement of wheel downwards
57 Lower flange for radial wheel on
58 Bolt for flange 57
59 upper contacting surface between the wheel and the rail, at small loads
60 Lower contacting surface between the wheel and the rail, at extreme loads
61 Locking ring for radial shaft support closest to the radial wheel
62 Radial shaft support for shaft support in other end of shaft
63 Center of contact between the radial wheel and rail at extreme load
64 Center of contact between the radial wheel and the rail at initial contact, at low load
65 Contact area during low load
66 Contact area during extreme load

The invention claimed is:

1. A structural suspension of radial turret bearing wheels in a turret bearing, comprising:
a rail support structure mounted on a turret bearing support structure;
a circular rail mounted to the rail support structure, the rail having a mainly vertical inner side and a top;
a plurality of radial wheels running on the vertical inner side of the rail, the radial wheels each having a mainly planar contacting surface;
a mainly vertical flexible shaft, for each radial wheel being supported by an upper shaft support and a lower shaft support with a part of the vertical flexible shaft protruding like a cantilever with the radial wheel mounted close to an outer end of the vertical flexible shaft,
wherein the vertical inner side of the circular rail is a frustum with a shortest radius at the top,
wherein the outer planar contacting surface of the wheel has an angle θ relative to a rotational axis of the radial wheel, and is overlaid with a convex curvature across the planar contacting surface,
wherein a distance between a radial wheel and the vertical inner side of the rail is adjusted by:
the vertical flexible shaft comprising at least two lockable rotational positions, an upper shaft portion of the vertical flexible shaft having a centerline offset relative to a rotational axis of the shaft.

2. The suspension according to claim 1 wherein the at least two lockable positions are provided by the lower shaft support comprising a shape that mates with a similar shape on a lower end of the shaft in at least two angular positions.

3. The suspension according to claim 2 wherein the shape on the lower shaft support is a hexagon or an octagon.

4. The suspension according to claim 2 wherein the shape on the lower shaft support is a cogwheel with at least two teeth.

5. The suspension according to claim 1, wherein the rotational axis of the radial wheel is tilting an angle A relative to an unloaded condition of the axis, when the vertical flexible shaft is under maximum load, and wherein an angle E between the vertical inner side of the rail and a tangent of the convex curvature across the planar contacting surface is less than zero at a top for conditions without load and larger than A at a bottom for conditions with maximum load.

6. The suspension according to claim 1 wherein a pipe is mounted between the lower shaft support and the upper shaft support to cover the vertical flexible shaft.

7. The suspension according to claim 1 wherein the radial wheel is supported by a bushing, which is able to slide on the vertical flexible shaft the same distance as a maximum vertical movement of a turret relative to the circular rail under maximum load and a vertical movement imposed by angular deflection A of the radial wheel.

8. The suspension according to claim 1 wherein a flange is mounted on an upper rim of the radial wheel.

9. The suspension according to claim 1 wherein the radial wheel is vertically locked to the circular rail by having a lower flange mounted on a top rim of the radial wheel.

10. The suspension according to claim 1 wherein the outer mainly planar contacting surface of the radial wheel with an angle θ relative to the rotational axis of the radial wheel is overlaid with a convex curvature having a shorter radius at a top of the radial wheel and a longer radius at the bottom of the radial wheel.

11. The suspension according to claim 1 wherein the upper shaft support comprises a spherical bearing assembly comprising a spherical ring with a sliding surface and a spherical ball inside the spherical ring with a material matching the sliding surface of the spherical ring, and a housing comprising a top lid fastened to the housing by bolts.

12. The suspension according to claim 1 wherein a cantilevered length, H1, between the upper shaft support and the center of the radial wheel is about three times the length, H2, between the lower shaft support and the upper shaft support.

13. The suspension according to claim 1 wherein a cross section of the vertical flexible shaft is tapered downward and upward from a largest diameter d1 at the upper shaft support, downward to a diameter d3 at the lower shaft support and upward to a diameter d2 at a lower side of the radial wheel, wherein d2 is in the range of 50 to 80% of d1 and d3 is in the range of 40 to 60% of d1.

14. The suspension according to claim 1 wherein the material of the vertical flexible shaft is a steel alloy comprising Molybdenum and Chrome.

* * * * *